(12) United States Patent
Krimmer et al.

(10) Patent No.: US 6,321,725 B1
(45) Date of Patent: Nov. 27, 2001

(54) VALVE FOR METERED INTRODUCTION OF EVAPORATED FUEL

(75) Inventors: Erwin Krimmer, Pluederhausen; Wolfgang Schulz, Bietigheim-Bissingen; Tilman Miehle, Kernen; Manfred Zimmermann, Bad Rappenau; Achim Meisiek, Rudersberg; Maria Esperilla, Meimsheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,402
(22) PCT Filed: Jun. 12, 1999
(86) PCT No.: PCT/DE99/01729
  § 371 Date: Oct. 2, 2000
  § 102(e) Date: Oct. 2, 2000
(87) PCT Pub. No.: WO00/29738
  PCT Pub. Date: May 25, 2000

(30) Foreign Application Priority Data

Nov. 17, 1998 (DE) .............................................. 198 52 980

(51) Int. Cl.[7] .......................... F02M 33/02; F16K 31/02; F16K 31/12
(52) U.S. Cl. ........................ 123/516; 251/129.16; 251/54
(58) Field of Search .................................... 123/516, 520; 251/129.16, 129.19, 54

(56) References Cited

U.S. PATENT DOCUMENTS

| 4,475,690 | * | 10/1984 | Hascher-Reichl et al. ..... 251/129.16 |
| 4,890,815 | * | 1/1990 | Hascher-Reichl et al. ..... 251/129.15 |
| 4,986,246 | * | 1/1991 | Kessler . | |
| 5,178,116 | * | 1/1993 | Fehrenbach et al. ................ 123/516 |
| 5,809,977 | * | 9/1998 | Krimmer et al. .................... 123/516 |

FOREIGN PATENT DOCUMENTS

| 42 44 113 | * | 6/1994 | (DE) . |
| 196 11 886 | * | 10/1997 | (DE) . |
| 0 722 061 | * | 7/1996 | (EP) . |
| 2 117 090 | * | 10/1983 | (GB) . |

* cited by examiner

Primary Examiner—Thomas N. Moulis
(74) Attorney, Agent, or Firm—Ronald E. Greigg

(57) ABSTRACT

A solenoid valve for tank ventilation in motor vehicles, comprising a magnetic yoke with at least one valve opening and with a cooperating spring-loaded valve member for opening and closing the at least one valve opening. The valve element constitutes a magnetic armature of an electromagnet and is disposed between the magnetic yoke of the electromagnet and a hollow, cylindrical magnet core of the electromagnet. A valve seat body which is separate from the magnetic yoke and contains the at least one valve opening is disposed in an axial opening in the magnetic yoke, and on a side remote from the valve member. The valve seat body rests against a housing wall of the solenoid valve by use of a support element made of a damping material.

6 Claims, 5 Drawing Sheets

VALVE FOR METERED INTRODUCTION OF EVAPORATED FUEL

PRIOR ART

The invention relates to a valve for metered introduction of fuel evaporated from a fuel tank of an internal combustion engine into the internal combustion engine.

A valve of this kind is based, for example, on DE 42 44 113 A1 and DE 196 11 886 A1.

Valves of this kind are used for regenerating adsorption filters for fuel vapor retention systems in vehicle fuel tanks.

A cyclical triggering of the electromagnet that influences the valve position can lead to unpleasant operating noise as a result of contact between parts that move in relation to one another.

With the valve provided in DE 42 44 113 A1, in order to reduce this kind of unpleasant operating noise, at least one damping element is provided which passes through the valve closing member in the axial direction and which, on the first end face of the valve closing member, forms a first damping surface oriented toward the valve seat body and on the second end face of the valve closing member, forms a second damping surface oriented toward the electromagnet so that a collision of the valve closing member against the valve seat body or against the magnet core is damped.

DE 196 11 886 A1 has disclosed forming axial grooves into the valve member, which are open toward the through opening, pass through the valve member longitudinally, and are filled with damping material that protrudes beyond the second end face of the valve member. By virtue of the damping material being introduced into the continuous axial grooves, the damping material can be accommodated in the second damping section without significant loss of ferromagnetic armature material in the valve member, which material is required in order for there to be a sufficient magnetic flux in the valve member for the valve member to be moved rapidly. In this manner, with the same wall thickness of the damping material lining in the through opening, the damping section is enlarged by the additional damping surfaces which are produced on the end face of each axial groove by the damping material that protrudes there. Furthermore, the height of the material ring of the through opening lining protruding at the end face can be reduced by means of this arrangement, which results in an increase in the magnetic force.

An object of the invention is to develop a valve of this type in such a way that an operating noise is further reduced when there is an increased throughput of air, i.e. for larger regeneration quantities.

ADVANTAGES OF THE INVENTION

In a valve for metered introduction of fuel evaporated from a fuel tank of an internal combustion engine into the internal combustion engine of the type described at the beginning, this object is attained by means of the features set forth hereinafter.

The valve seat body, which is disposed in an axial opening in the magnetic yoke and is supported on a side remote from the valve member against a housing wall of the solenoid valve by means of a supporting element made of damping material, prevents the transmission of cyclical noise into the housing and from this housing into metallic parts of the internal combustion engine to the greatest extent possible during cyclical triggering of the valve. Each collision of the valve member against the valve seat body is transmitted from the valve seat body, which is disposed separate from the magnetic yoke, to the support element made of damping material and only then on to the valve housing. Noise generation is sharply reduced by means of this multiply damped transmission path for structure-borne noise.

An advantageous embodiment provides that the support element at least partially encloses the valve seat body on a side remote from the valve member. A damping is thus produced not only in the valve closing direction but also perpendicular to the valve closing direction.

A particularly advantageous embodiment provides that the support element has the shape of a cup oriented toward the valve member on the inside of which is disposed at least a part of the valve seat body oriented toward the support element.

In particular, this embodiment has the great advantage that a fully automatic and therefore simple manufacture is possible since the support element can be mounted in the valve housing in a simple fashion along with the valve seat body.

BRIEF DESCRIPTION OF THE DRAWINGS

Other advantages and features of the invention are the subject of the following description and of the graphic depiction of the exemplary embodiments.

DESCRIPTION OF THE EXEMPLARY EMBODIMENTS

Figure 1:
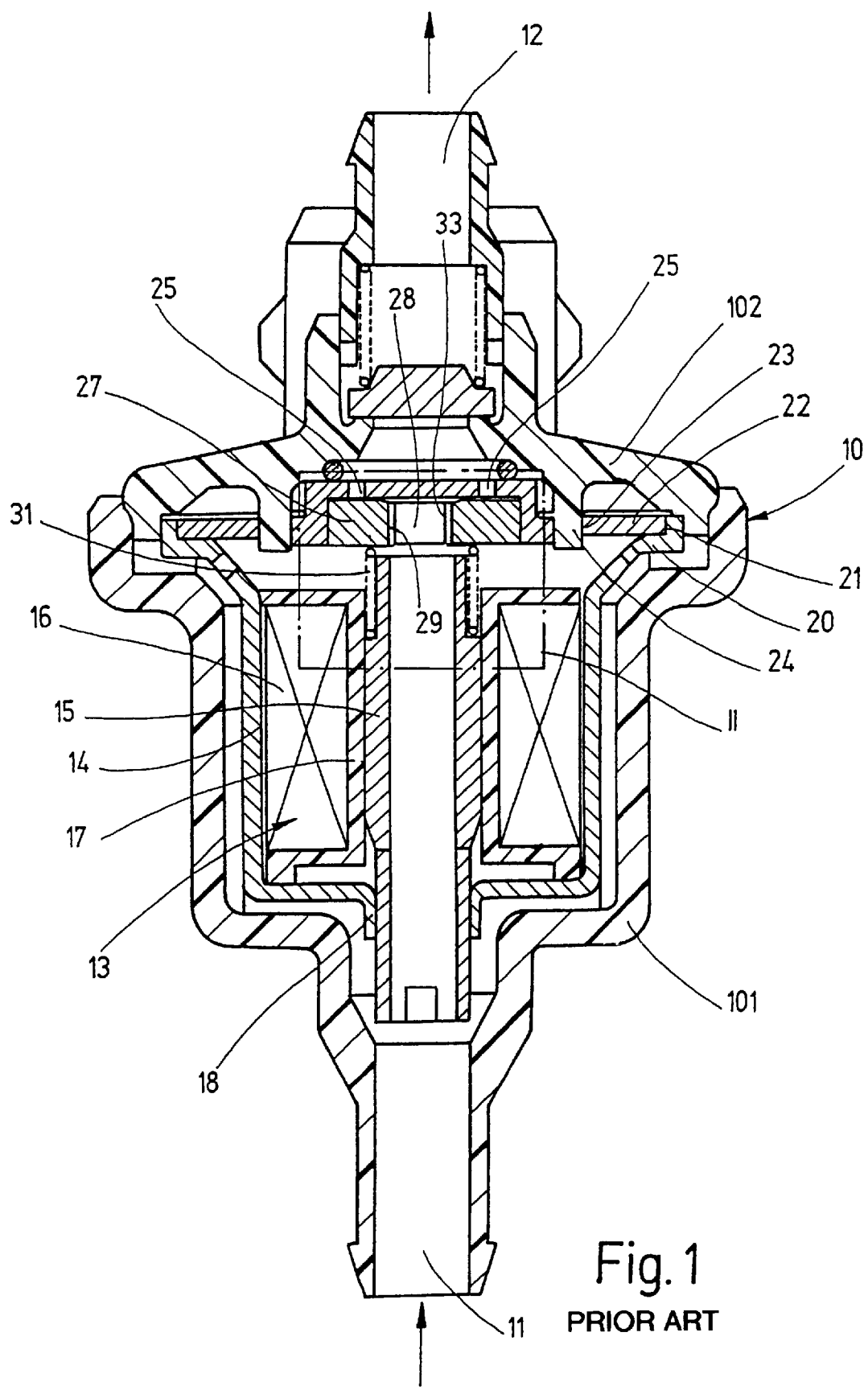
FIG. 1 is a schematic longitudinal section through a valve known from the prior art.

A tank ventilation valve known from the prior art, which is shown in a longitudinal section in FIG. 1 as an exemplary embodiment for an arbitrary solenoid valve, is used for the metered admixture of fuel evaporated from the fuel tank of a mixture compressing internal combustion engine with externally supplied ignition (not shown). The evaporated fuel is directed into the internal combustion engine, e.g. into an intake tube or, in the case of gasoline direct injection, directly into a cylinder of the internal combustion engine, and is part of a fuel vapor retention system, not shown in detail, of an internal combustion engine. The design and function of such fuel vapor retention systems can be taken, for example, from "Bosch Technische Unterrichtung, Motormanagement Motronic" [Bosch Technical Instruction, Engine Management Motronics], $2^{nd}$ edition, August 1993, pp. 48 and 49. A tank ventilation valve and its function can be seen, for example, in DE 42 44 113 A1 and DE 196 11 886 A1, to which the current case makes reference.

The tank ventilation valve has a two-part valve housing 10 with a cup-shaped housing part 101 and a cap-shaped housing part 102 that closes the housing part 101. The housing part 101 has an inflow fitting 11 for connection to a ventilation fitting of the fuel tank or to a receptacle for the fuel vapor, which is connected to the tank and is filled with activated charcoal. The housing part 102 has an outflow fitting 12 for connection to the intake tube of the internal combustion engine. The inflow fitting 11 and the outflow fitting 12 are axially disposed in the respective housing parts 101, 102 so that the inflow and outflow fittings are aligned with each other. An electromagnet 13 is disposed inside the cup-shaped housing part 101.

The electromagnet 13 has a cup-shaped magnet housing 14 with a hollow, cylindrical magnet core 15 that passes through the cup bottom coaxially and a cylindrical excitation coil 16, which rests on a coil support 17 that encompasses the magnet core 15 in the magnet housing 14. On the bottom of the magnet housing 14, a threaded fitting 18 is provided, the threaded fitting 18 protrudes outward and is provided with an internal thread, which is screw connected to an externally threaded section of the hollow, cylindrical magnet core 15. For adjustment purposes, the magnet core 15 can thus be moved axially by rotating the magnetic core in the magnet housing 14. The magnet core 15 is aligned with the inflow fitting 11 so that the fuel vapor which flows in at this point flows directly through the magnet core 15.

The edge of the magnetic housing 14 is angled outward into an annular support flange 20, which is bent at the end into an axially protruding annular rib 21. The valve seat body which constitutes the magnetic yoke 22 of the electromagnet 13 is contained in the support flange 20 and this valve seat body covers the magnet housing 14 and rests against the annular rib 21 along its edge. As shown in FIG. 1, the magnetic yoke 22, for example, by means of at least two dowel openings 23, rests on retaining pins 24 embodied in the cap-shaped housing part 102 and is clamped in the support flange 20 in a form-fitting manner by the cap-shaped housing part 102. In the magnet yoke 22 that constitutes the valve seat body, there are two valve openings 25, which can be closed by means of a valve member 27 disposed between the magnet yoke 22 and magnet core 15. An axial through opening 28 with a boundary wall 29 is provided in the center of the valve member 27, coaxial to the hollow, cylindrical magnet core 15, and fuel vapor arriving by way of the inflow fitting 11 can flow through this axial through opening to the outflow fitting 12 when the valve openings 25 are open. The valve member 27, which is made of magnetically conductive material, is acted on in the valve closing direction toward the outflow fitting 12 by a valve closing spring 31. The valve closing spring 31 is supported on one end against the valve member 27 and is supported on the other end against a sleeve-shaped end of the magnet core 15.

Figure 2:
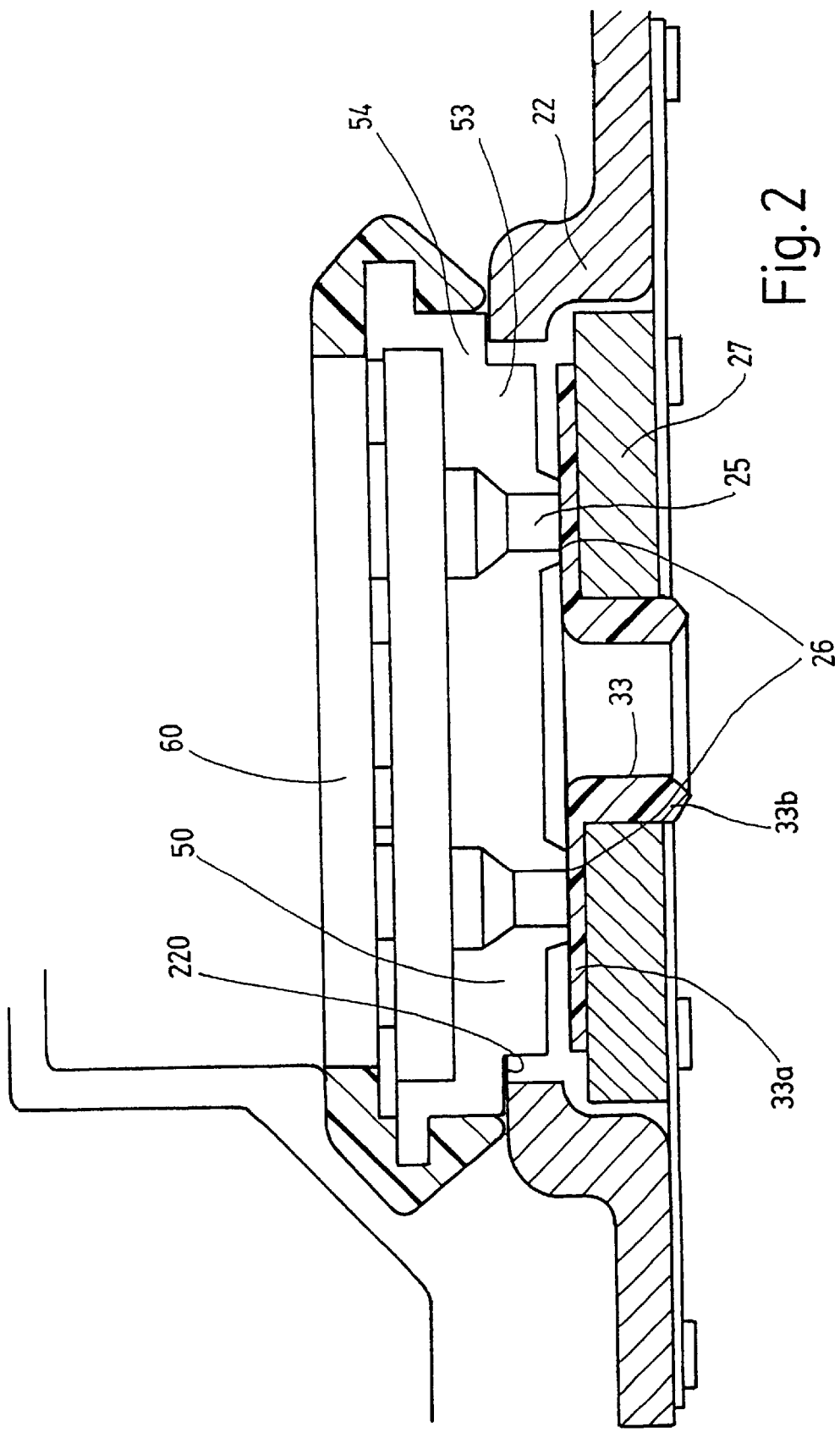
FIG. 2 is a schematic longitudinal section through a valve seat body and a support element of a valve according to the invention.
Figure 3:
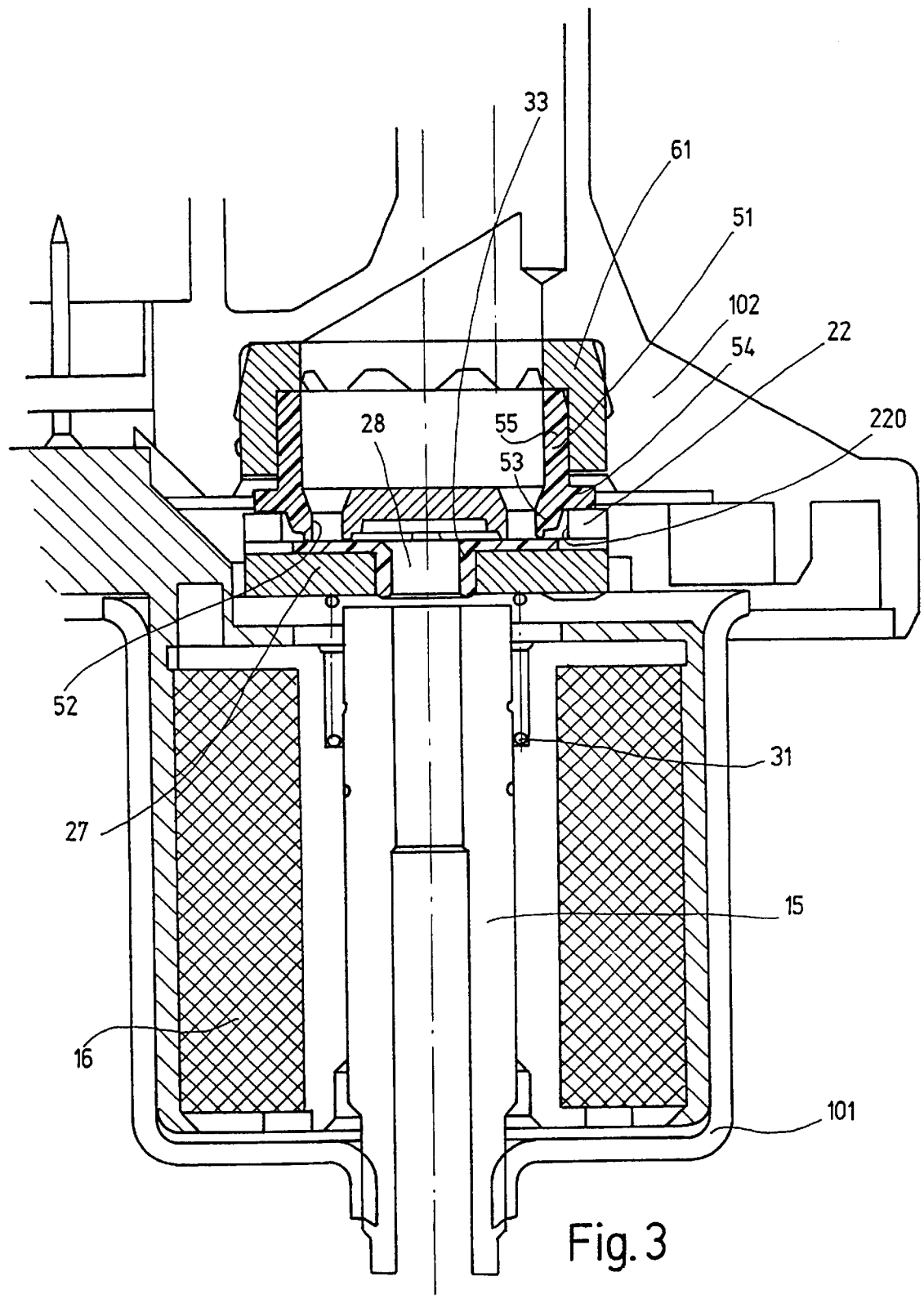
FIG. 3 is a longitudinal, sectional depiction of another embodiment of a valve according to the invention.
Figure 4:
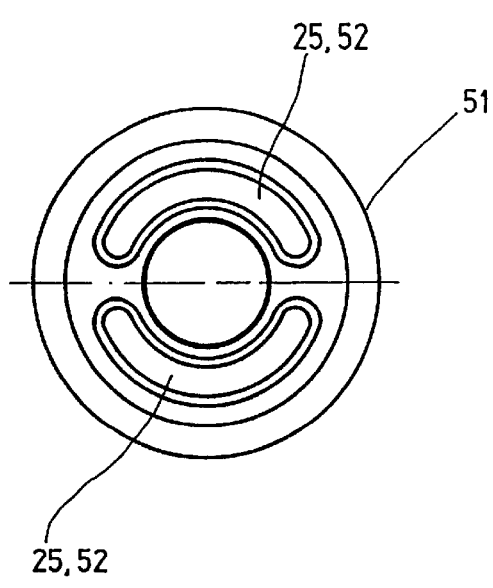
FIG. 4 is an end view of a valve seat body of the valve shown in FIG. 3.
Figure 5:
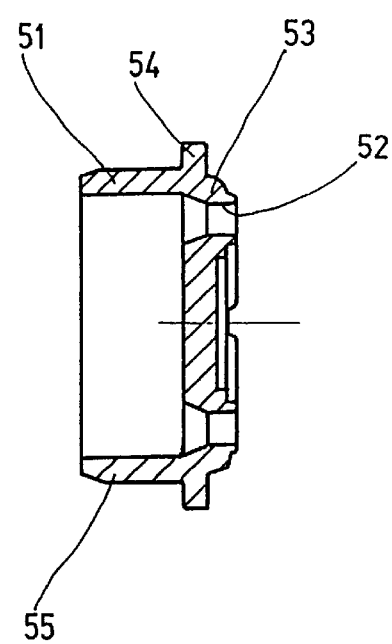
FIG. 5 is a longitudinal, sectional view of the valve seat body shown in FIG. 4.
Figure 7:
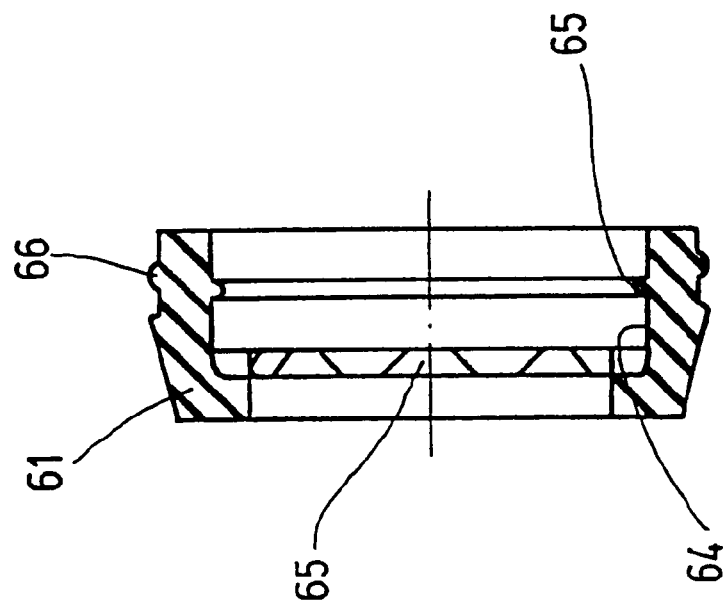
FIG. 7 is a longitudinal, sectional view of the support element shown in FIG. 6.
Figure 6:
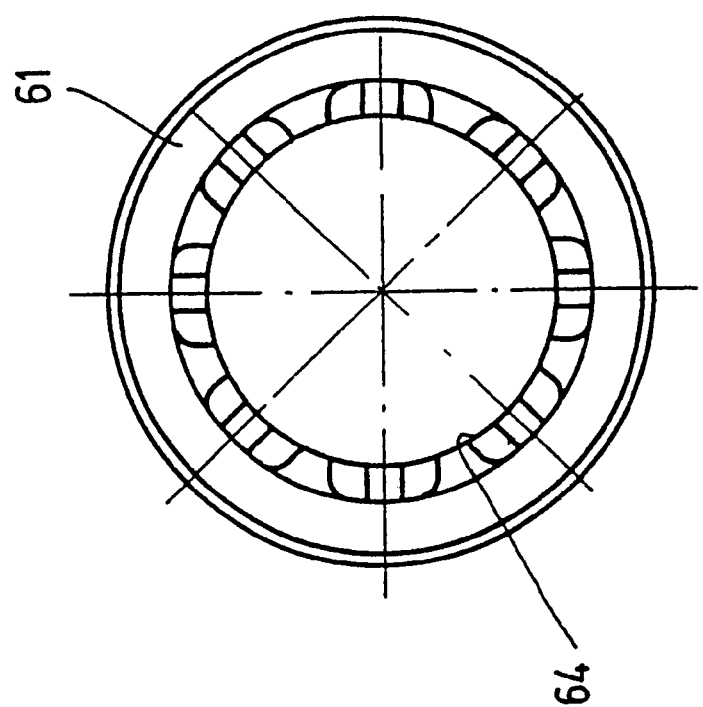
FIG. 6 is an end view of a support element of the valve shown in FIG. 3.

On its side oriented toward the magnetic yoke 22, the valve member supports a sealing damper element 33 made of elastic damping material, e.g. elastomer see FIG. 2. This damper element 33 also lines the through opening 28 in the valve member 27. On the one end, the elastic damping material covers a first damping section 33a that extends in planar fashion on the first end face of the valve member 27 oriented toward the magnetic yoke 22, and on the other end, the elastic damping material covers a second damping section 33b that protrudes beyond the second end face of the valve member 27 oriented toward the magnet core 15 (see FIG. 2). The surface of the first damping section 33a is thereby at least large enough for the first damping section 33a to cover over the two valve openings 25 of the valve seat 26 when the valve is closed.

This damper element 33 made of damping material achieves a noise reduction during cyclical operation of the valve member.

In order to further reduce noise generation, a first embodiment shown in FIG. 2 provides that the magnetic yoke 22 has an opening 220 in which a step-shaped valve seat body 50 is disposed, which is separate from the magnetic yoke 22 and has a valve seat section 53. With a support section 54 disposed on a side remote from the valve member 27 and oriented toward the cap-shaped housing part 102, the valve seat body 50 protrudes beyond the opening 220 in the magnetic yoke 22 and is encompassed there by a support element 60 made of elastomer material. The elastic damping material partially rests against the cap-shaped housing part 102 and on the one hand, serves to reduce secondary leakage air and on the other hand, serves to damp the transmission of structure-borne noise. The structure-borne noise transmission onto the housing, i.e. onto the cap-shaped housing part 102, is considerably reduced by means of this support element 60 made of elastomer material. The valve seat body 50 can be made of metal or plastic.

In a second exemplary embodiment shown in FIGS. 3 to 7, those elements which are identical to those of the first exemplary embodiment and to those of the embodiment known from the prior art are provided with the same reference numerals so that with regard to their description, fully inclusive reference is made to the explanations above.

In contrast to the above-described exemplary embodiment, in the exemplary embodiment shown in FIGS. 3 to 7, the support element 61 has the shape of a cup oriented toward the valve element 27, on the inside of the support element a part of the valve seat body 51 oriented toward the support element 61 is disposed. To this end, on a side oriented toward the support element 61, the valve seat body 51 has a form that is adapted to the inside of the support element 61, as can be seen in particular in FIG. 5 and FIG. 7. Semicircular openings 52 are disposed in the valve seat body 51, which correspond to the valve openings 25 of valves that are intrinsically known and are shown in FIG. 1.

The support element 61 has a central, stepped opening and, on an end face, has support elements 65 oriented toward the valve seat body 51. The support element 61, together with the valve seat body 51, can be easily mounted in the housing. As a mounting aid, corresponding insertion facets are disposed for this purpose on the components. It is also particularly advantageous that the support element 61 is easy to manufacture.

The valve seat body 51 that is embodied of metal or plastic has an elongated, cylindrical form with a bottom part which contains the openings 52 and in which the valve seat section 53 and the support section 54 are likewise embodied. A support section 55 extends in the direction pointing away from the valve member 27, and the support section 55 is engaged by the support element 61. In order to assure a reliable seal between the support section 55 and the support element 61, the support element 61 has at least one continuous, inwardly protruding annular bead 65 in a central opening, which rests with radial stress against the support section 55. Furthermore, the support element 61 has at least one continuous, outwardly protruding annular bead 66, which rests with radial stress against the housing 102 and produces a seal against insert the housing.

With a closing movement of the valve member 27, the valve member 27 strikes against the valve seat body 50, 51 and the elastic support element 60, 61 deforms minimally so that the valve seat body 50, 51 lifts up from the magnetic yoke 22 minimally, which prevents a direct transmission of structure-borne noise to the magnetic yoke 22. In the direction toward the housing, the support element 60, 61 damps the transmission of structure-borne noise.

The foregoing relates to a preferred exemplary embodiments of the invention, it being understood that other variants and embodiments thereof are possible within the spirit and scope of the invention, the latter being defined by the appended claims.

What is claimed is:

1. A solenoid valve for tank ventilation in motor vehicles, comprising an electromagnet (13), a magnetic yoke (22), with at least one valve opening (25, 52), a cooperating spring-loaded valve member (27) for opening and closing the at least one valve opening (25, 52), the valve element constituting a magnetic armature of the electromagnet (13) is disposed between the magnetic yoke (22) of the electromagnet (13) and a hollow, cylindrical magnet core (15) of the electromagnet (13), a valve seat body (50; 51), which is separate from the magnetic yoke (22) and contains the at least one valve opening (25), is disposed in an axial opening (220) in the magnetic yoke (22), and on a side remote from the valve member (27), the valve seat body rests against a housing wall (102) of the solenoid valve by means of a support element (60; 61) made of a damping material.

2. The valve according to claim 1, in which the support element (60; 61) at least partially encloses the valve seat body on a side remote from the valve member (27).

3. The valve according to claim 1, in which the support element (61) has the shape of a cup oriented toward the valve member (27), on an inside of the support element (61) a part of the valve seat body (51) that is oriented toward the support element (61) is disposed and is adapted to the support element.

4. The valve according to claim 1, in which the valve seat body (50; 51) is embodied as step-shaped, the valve seat body protrudes past the opening (220) in the magnetic yoke (22) with a support section (54), and extends into the opening (220) with a valve seat section (53).

5. The valve according to claim 2, in which the valve seat body (50; 51) is embodied as step-shaped, the valve seat body protrudes past the opening (220) in the magnetic yoke (22) with a support section (54), and extends into the opening (220) with a valve seat section (53).

6. The valve according to claim 3, in which the valve seat body (50; 51) is embodied as step-shaped, the valve seat body protrudes past the opening (220) in the magnetic yoke (22) with a support section (54), and extends into the opening (220) with a valve seat section (53).

* * * * *